Patented Nov. 10, 1931

1,831,784

UNITED STATES PATENT OFFICE

GEORGE H. BROWN, OF HIGHLAND PARK, NEW JERSEY

GLAZED ROCK GRANULE SURFACING AND ROOFING SURFACED THEREWITH

No Drawing. Application filed October 31, 1925. Serial No. 66,120.

My invention relates to rock granule surfacing material and its manufacture, and to roofing surfaced therewith, such as sheets and shingles of bituminously impregnated and coated fabric (e. g., paper felt) with mineral particles stuck in the coating of its weather side.

As a basic raw material for the purposes of my invention, I employ granules of refractory mineral or rock, such as quartzite, mica schist, ganister, or other rock or mineral that is susceptible of coloring or glazing as hereinafter described. These granules, as I have discovered, should be of a porous or absorbent character, so as to take the color or glaze better and in greater quantity and form a more intimate union therewith, as well as refractory to withstand (without complete bodily fusion) the high temperature required to flux the glaze and unite it with the granules thoroughly. Their surface should be more or less rough and have a good "tooth", as this facilitates coating them as hereinafter described, and also improves their adherence to the bituminous surfacing cement of the roofing to which they are ultimately applied. Various siliceous minerals, such as those above mentioned, answer most or all of these requirements quite well. Among such silicate materials, quartzite, especially, is a hard and vitreous silica rock, almost always somewhat granular in structure, and often very white or substantially free of intrinsic color.

In practicing my invention, the rock may be crushed and then classified into convenient sizes; ranging, say, from ¼ inch to 30 mesh, or thereabout. A size which will pass a 10 mesh sieve and be retained on a 30 mesh sieve is especially suitable, although the exact size is not essential. To these granules I impart a glaze of any color that may be desired, by interfusing fluxing or glazing agents with their surfaces,—without necessity for bodily fusion of the granules in their entirety. For this purpose, I take a mass of the classified rock granules and treat them (either by immersion or spraying) with an aqueous solution of water-soluble glaze, composed of any desired metallic coloring agent and a fluxing or fixing agent. For green colors, for example, I may employ copper sulphate or potassium or sodium dichromate in the color-glaze solution; for blue, cobalt nitrate; for brown, manganese chloride; for red, iron sulphate. Along with the metallic coloring salts (which may be used either singly or in any suitable combinations to produce the final color desired), I dissolve fluxing salts such as sodium nitrate, sodium carbonate (either the neutral or the acid carbonate), both of these are water-soluble alkali metal salts that readily crystallize from solution when the water is evaporated, or a neutral refractory agent, such as aluminum sulphate. For red or other colors containing iron, I preferably employ aluminum sulphate as the fixing material, rather than sodium nitrate, etc.

Using these salts in aqueous solution, as selected, for my soluble glaze, their proportions to water may be varied to practically any extent in order to regulate the amount that will be left on the basic granules, and thus control the depth of the final color. While considerable latitude is also permissible (and even necessary) in the ratio of coloring and other salts, as a general working basis I may employ substantially equal parts. They may be dissolved in water in such amounts as to give a solution of from about 5% to 25% concentration, for example. Measured on a dry basis, the proportions of coloring salts and fluxing agents combined to basic rock granules may vary, in general, from 25 pounds to 100 pounds of such agents for each ton of the rock granules.

Having wet and impregnated or saturated the rock granules with the soluble glaze, I expose them to a degree of heat (100° C. to 150° C.) sufficient to evaporate the water of the glaze and leave a residue or crust of the dry glaze on the surfaces of the granules and in their (outer) pores. The dry but impregnated and coated granules are then fired in a kiln or furnace at a temperature suitable to cause fusion of the glaze and combination thereof with the material (e. g. silica) at the surfaces of the granules,—thus producing solid solutions of metallic silicates of the characteristic color due to the presence of the particular metal or metals employed in the glaze. A firing temperature above red heat (525° C.) is generally required, but this may be increased to 900° C. for iron glazes, or to 1100° C. for chromes, etc. In this regard, the point to be observed is to produce a glazing compound comprising a superficial solid solution of colored metallic silicates on the granules and thereby seal their pores,—without, however, producing bodily fusion of the granules.

During the wetting, drying, and firing operations, etc., the granules may be kept in motion or agitation, in a rotary drum dryer, in a rotary kiln, or by other suitable means, so as to expose each particle on all sides to the same amount of solution or the same degree of heat, etc.

After firing the granules as hereinbefore described, they are brought into a cooling zone and subjected to a cooling medium (e. g. a blast of cold air) until reduced substantially to ordinary atmospheric or room temperature.

The definitely colored granular product thus obtained may be applied to form the weather surface of prepared roofing in the usual manner, by embedding the particles in the hot bituminous coating of a bituminously impregnated base and allowing the product to cool,—when any superfluous particles can readily be shaken off.

The glazed and colored particles thus produced are quite impervious, both to moisture from the atmosphere and to oils from the bituminous roofing to which they are applied. The compounds (silicates) formed in the firing operation completely coat the granules with an insoluble gloss-like coating or surface glaze, so that their color is insoluble and highy permanent, with the high weather-resisting properties, etc., generally characteristic of ceramic glazes. They may easily be given the richest colors, since the amount of coloring agent required, as indicated above, is so small as to permit the use of relatively expensive materials for this purpose. The simplicity of my process of applying colored glaze by bulk treatment of the granules and the employment of basic granules (such as crushed quartzite or ganister) which are practically pure silica,—free from iron, and not requiring preliminary treatment to render them absorbent or otherwise suitable for my purpose,—result in great economy as compared with the preparation of colored granules by other methods. On bituminous roofings, they are non-absorbent and non-blistering, and thus free from the disadvantages in these respects (discoloration or the like) which have characterized surfacings of colored slate and other such mineral granules.

It is to be understood that the term "refractory" as used in the appended claims contemplates such a degree of resistance to heat as to withstand, without complete fusion, the temperature necessary to fuse a glaze; and that the term "mineral" is intended to include "rock."

Having thus described my invention, I claim:—

1. A process of producing glazed granules of the character described, which comprises wetting refractory mineral granules with an aqueous glaze solution, drying the granules and fusing the added material into a glaze coating on them.

2. A process of producing glazed granules of the character described, which comprises treating rough refractory mineral granules of siliceous material with an aqueous glaze solution, and drying and heating the granules sufficiently to superficially interfuse the added material with the granules, without complete bodily fusion of the granules.

3. A process of producing glazed granules of the character described, which comprises impregnating granules of porous refractory mineral material with flux and a coloring agent, and heating them to a sufficient temperature to fuse and superficially combine the added material with mineral material of the granules, without complete bodily fusion of the granules.

4. A process according to claim 3 wherein the mineral material treated is an iron-free silica mineral material.

5. The method of producing colored granules which comprises treating, in bulk, granules of refractory material with a solution of a crystallizable salt and a coloring salt, drying the treated granules, and firing the same to form a glass-like coating thereon.

6. The method of producing colored granules which comprises treating, in bulk, granules of refractory mineral material with a solution of a crystallizable alkali-metal salt and a coloring salt, drying the granules and firing the same to fuse the alkali-metal salt and to form therefrom with the coloring compound a glass-like colored coating.

7. New articles of manufacture, comprising granules having a refractory siliceous mineral base and a colored glass-like coating substantially completely covering the surfaces thereof, said coating comprising the fusion product of an alkali metal salt, siliceous material of the base and a coloring compound.

8. New articles of manufacture, comprising granules of refractory mineral material substantially completely coated with a colored glass-like coating containing a coloring compound.

9. Granular material of the character described, comprising quartzite granules coated and superficially interfused with glaze.

10. Granular material of the character described, comprising rough refractory mineral granules with a coating of glaze superficially interfused with them and keyed into their inequalities.

11. Granular material of the character described, comprising rough refractory mineral granules surfaced with a fused glaze keyed into their inequalities.

12. Granular material of the character described, comprising refractory mineral granules individually coated and superficially interfused with glaze.

13. Bituminous roofing of the character described, having its weather surface mineralized with glazed granules as set forth in claim 12.

14. A method of preparing decorative surfacing material of the character described which includes fusing a glaze superficially on granular naturally refractory material.

15. A surfacing material comprising granules of naturally refractory material substantially wholly coated with a fused glaze.

16. A surfacing material comprising granules of naturally refractory material substantially wholly coated with a colored fused glaze.

17. Granular material of the character described comprising refractory siliceous mineral granules individually coated and superficially interfused with glaze.

18. A process according to claim 3 wherein the mineral material is an iron free siliceous refractory material.

19. Granular material of the character described comprising granules of refractory siliceous mineral material coated with a fused glaze.

20. Granular material of the character described comprising granules of iron free refractory mineral material coated with a fused glaze.

21. Bituminous roofing of the character described having its weathered surface mineralized with glazed granules as set forth in claim 15.

22. Bituminous roofing of the character described having its weathered surface mineralized with glazed granules as set forth in claim 11.

23. A roofing material comprising a base the surface of which is mineralized with glazed granules as set forth in claim 15.

24. A roofing material comprising a base the surface of which is mineralized with glazed granules as set forth in claim 12.

In testimony whereof, I have hereunto signed my name at New Brunswick, N. J., this 19th day of October, 1925.

GEORGE H. BROWN.